(12) United States Patent
Beck et al.

(10) Patent No.: US 12,374,697 B2
(45) Date of Patent: Jul. 29, 2025

(54) INERTIALLY ENHANCED MASS TRANSPORT USING POROUS FLOW-THROUGH ELECTRODES WITH PERIODIC LATTICE STRUCTURES

(71) Applicant: Lawrence Livermore National Security, LLC, Livermore, CA (US)

(72) Inventors: Victor Alfred Beck, Livermore, CA (US); Sarah Baker, Dublin, CA (US); Swetha Chandrasekaran, Livermore, CA (US); Eric Duoss, Livermore, CA (US); Jean-Baptiste Forien, Livermore, CA (US); Anna Nikolaevna Ivanovskaya, Mountain View, CA (US); Marcus Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 34 days.

(21) Appl. No.: 17/692,870

(22) Filed: Mar. 11, 2022

(65) Prior Publication Data
US 2023/0275238 A1    Aug. 31, 2023

Related U.S. Application Data

(60) Provisional application No. 63/160,197, filed on Mar. 12, 2021.

(51) Int. Cl.
*H01M 4/86* (2006.01)
*H01M 8/18* (2006.01)

(52) U.S. Cl.
CPC ......... *H01M 4/8626* (2013.01); *H01M 8/188* (2013.01)

(58) Field of Classification Search
CPC ...... H01M 4/8626; H01M 8/188; H01M 4/88; H01M 4/96; H01M 8/18; H01M 4/86; C02F 1/4604; C02F 1/469; C02F 2001/46161; C02F 1/46114; C25B 3/00; C25B 11/031; C25B 11/043; B33Y 10/00; B33Y 80/00
(Continued)

(56) References Cited

U.S. PATENT DOCUMENTS 5,055,171 A * 10/1991 Peck ............... H01M 10/20
204/291
7,488,547 B1    2/2009 Iacovelli
(Continued)

FOREIGN PATENT DOCUMENTS

CN      111584895 A      8/2020
WO   WO-2018091042 A1 *  5/2018

OTHER PUBLICATIONS

Lolsberg et. al., 3D printed electrodes with improve mass transfer properties, 4, 12, 3309-3313, 2017 (Year: 2019).*
(Continued)

*Primary Examiner* — Christian Roldan
(74) *Attorney, Agent, or Firm* — Perkins Coie LLP

(57) ABSTRACT

Disclosed are flow-through electrode devices and techniques for making flow-through electrodes. In one aspect, a flow through electrode apparatus comprises one or more fiber layers. Each fiber layer comprises a plurality of fibers oriented to be orthogonal to a flow direction of a fluid. The plurality of fibers are configured to cause an inertial flow of the fluid around the plurality of fibers at a first flow rate of the fluid.

11 Claims, 11 Drawing Sheets

(58) Field of Classification Search
USPC .......................................................... 429/523
See application file for complete search history.

(56) References Cited

U.S. PATENT DOCUMENTS

| | | | | |
|---|---|---|---|---|
| 8,956,757 | B2* | 2/2015 | Yang | H01M 4/72 |
| | | | | 429/127 |
| 2006/0219986 | A1* | 10/2006 | Yokota | H01M 4/625 |
| | | | | 429/535 |
| 2013/0224625 | A1* | 8/2013 | Sumioka | D21H 13/50 |
| | | | | 429/482 |
| 2015/0118550 | A1* | 4/2015 | Shon | H01M 4/8875 |
| | | | | 264/29.1 |
| 2019/0260033 | A1 | 8/2019 | Kajiwara et al. | |
| 2021/0050600 | A1 | 2/2021 | Uhm et al. | |

OTHER PUBLICATIONS

Beck, V. A. et al., "Inertially enhanced mass transport using 3D-printed porous flow-through electrodes with periodic lattice structures", Proceedings of the national academy of sciences, Aug. 6, 2021, vol. 11 8, No. 32, Article No. e2025562118, pp. 1-10.

International Search Report and Written Opinion mailed Jun. 30, 2022 for International Patent Application No. PCT/US2022/019944.

Maleki, M. et al., "Fabrication of an efficient vanadium redox flow battery electrode using a free-standing carbon-loaded electrospun nanofibrous composite", Scientific reports, 2020, vol. 10, Article No. 1115 3, pp. 1-14.

"Fuel Cell Store", https://www.fuelcellstore.com/.

Acrivos, A. , "On the Solution of the Convection Equation in Laminar Boundary Layer Flows", Chemical Engineering Science 1962, 17 (6), 457-465., pp. 457-465.

Alam, T. , et al., "A comprehensive review on single phase heat transfer enhancement techniques in heat exchanger applications", Renewable & Sustainable Energy Reviews 2018, 81, 813-839, pp. 813-839.

Alias, M. , et al., "Active direct methanol fuel cell: An overview", International Journal of Hydrogen Energy 2020, 45 (38), 19620-19641., pp. 19620-19641.

Arenas, L. , et al., "3D-printed porous electrodes for advanced electro chemical flow reactors: A Ni/stainless steel electrode and its mass transport characteristics", Electrochemistry Communications 2017, 77, 133-137, pp. 133-137.

Baier, G. , et al., "Prediction of mass transfer rates in spatially periodic flows", Chemical Engineering Science 1999, 54 (3), 343-355., pp. 343-355.

Banerjee, R. , et al., "Carbon felt electrodes for redox flow battery: Impact of compression on transport properties.", Journal of Energy Storage 2019, 26., p. 26.

Bek, R. Y, et al., "Mass Transfer Coefficient and Area Accessible to Electrolysis in Flow-Through Graphitic-Carbon-Fiber Electrodes", 1978, 14 (8), 1034-1039, 1978, pp. 1034-1039.

Bushuyev, O. , et al., "What Should We Make with CO2 and How Can We Make It?", Joule 2018, 2 (5), 825-832, pp. 825-832.

Carta, R. , et al., "Behavior of a Carbon Felt Flow by Electrodes .1. Mass-Transfer Characteristics", Journal of Applied Electrochemistry 1991, 21 (9), 793-798, pp. 793-798.

Castaneda, L. , et al., "Graphite felt as a versatile electrode material: Properties, reaction environment, performance and applications.", Electrochimica Acta 2017, 258, 1115-1139., pp. 1115-1139.

Darling, R. , et al., "The Influence of Electrode and Channel Configurations on Flow Battery Performance", Journal of the Electrochemical Society 2014, 161 (9), A1381-A1387., pp. A1381-A1387.

Delanghe, B. , et al., "Mass-Transfer to a Carbon or Craphite Felt Electrode", Electrochimica Acta 1990, 35 (9), 1369-1376, pp. 1369-1376.

Fedkiw, P. , et al., "Mass-Transfer Coefficients in Packed-Beds at Very Low Reynolds-Numbers", International Journal of Heat and Mass Transfer 1982, 25 (7), 935-943, pp. 935-943.

Feldman, D. , et al., "On the Path to SunShot: Emerging Opportunities and Challenges in Financing Solar", U.S. Department of Energy, Office of Scientific and Technical Information, U.S. Office of the Assistant Secretary of Energy Efficiency and Renewable Energy: 2016.

Fleischmann, M. , et al., "Industrial Electrosyntheses", Chemistry in Britain 1975, 11 (2), 50-54., pp. 50-54.

Forner-Cuenca, A., et al., "Engineering porous electrodes for next-generation redox flow batteries: recent progress and opportunities", Current Opinion in Electrochemistry 2019, 18, 113-122, pp. 113-122.

Gabardo, C. , et al., "Continuous Carbon Dioxide Electroreduction to Concentrated Multi-carbon Products Using a Membrane Electrode Assembly", Joule 2019, 3 (11), 2777-2791, pp. 2777-2791.

Gyuk, I., et al., "Grid Energy Storage", US Department of Energy: Washington DC, 2013.

Hereijgers, J. , et al., "Indirect 3D Printed Electrode Mixers", Chemelectrochem 2019, 6 (2), 378-382, pp. 378-382.

Ho, B. , et al., "Microfluidic fuel cell systems", Central European Journal of Engineering 2011, 1 (2), 123., p. 123.

Houghton, R. , et al., "Mass-Transport Problems and Some Design Concepts of Eletrochemical Reactors", Journal of Applied Electrochemistry 1974, 4 (3), 173-190, pp. 173-190.

Ke, X. , et al., "Rechargeable redox flow batteries: flow fields, stacks and design considerations", Chemical Society Reviews 2018, 47 (23), 8721-8743., pp. 8721-8743.

Kim, M. , et al., "Metal Nanowire Felt as a Flow-Through Electrode for High-Productivity Electrochemistry", Acs Nano 2019, 13 (6), 6998-7009, pp. 6998-7009.

Kok, M. , et al., "Mass transfer in fibrous media with varying anisotropy for flow battery electrodes: Direct numerical simulations with 3D X-ray computed tomography", Chemical Engineering Science 2019, 196, 104-115., pp. 104-115.

Lange, C. , et al., "Momentum and heat transfer from cylinders in laminar crossflow at 10(-4) <= Re <= 200", International Journal of Heat and Mass Transfer 1998, 41 (22), 3409-3430., pp. 3409-3430.

Le, T. , et al., "Carbon felt based-electrodes for energy and environmental applications: A review", Carbon 2017, 122, 564-591, pp. 564-591.

Lee, K. , et al., "Theoretical-Study of Aerosol Filtration by Fibrous Filters", Aerosol Science and Technology 1982, 1 (2), 147-161., pp. 147-161.

Legland, D. , et al., "MorphoLibJ: integrated library and plugins for mathematical morphology with ImageJ", Bioinformatics 2016, 32 (22), 3532-3534., pp. 3532-3534.

Lolsberg, J., et al., "3D-Printed Electrodes with Improved Mass Transport Properties", Chemelectrochem 2017, 4 (12), 3309-3313, pp. 3309-3313.

Milshtein, J. , et al., "Quantifying Mass Transfer Rates in Redox Flow Batteries", Journal of the Electrochemical Society 2017, 164 (11), E3265-E3275, pp. E3265-3275.

Montoya, J. , et al., "Materials for solar fuels and chemicals", Nature Materials 2017, 16 (1), 70-81., pp. 70-81.

Newman, J. J, "Extension of the Leveque solution", Journal of Heat Transfer 1969, 91, 177-178., 1969, pp. 177-178.

Perry, M., et al., "Advanced Redox-Flow Batteries: A Perspective", Journal of the Electrochemical Society 2016, 163 (1), A5064-A5067, pp. A5064-A5067.

Popel, A. S, et al., "Mass transfer in the entrance region of a circular tube", International Journal of Heat and Mass Transfer 1978, 21 (8), 1133-1141., 1978, pp. 1133-1141.

Schindelin, J. , et al., "Fiji: an open-source platform for biological-image analysis", Nature Methods 2012, 9 (7), 676-682, pp. 676-682.

Schmal, D. , et al., "Mass-Transfer Study at Carbon-Fiber Electrodes", Journal of Applied Electrochemistry 1986, 16 (3), 422-430., pp. 422-430.

Soloveichik, G. , "Flow Batteries: Current Status and Trends", Chemical Reviews 2015, 115 (20), 11533-11558, pp. 11533-11558.

(56) References Cited

OTHER PUBLICATIONS

Spielman, L., et al., "Model for predicting pressure drop and filtration efficiency in fibrous media", Environmental Science & Technology 1968, 2 (4), 279-287, pp. 279-287.

Stewart, W., "al Flows. 1.1 Asymptotic Solutions for Fixed Interfaces", Aiche Journal 1963, 9 (4), 528-536, pp. 528-536.

Suss, M., et al., "Capacitive desalination with flow-through electrodes", Energy & Environmental Science 2012, 5 (11), 9511-9519, pp. 9511-9519.

Tooker, A., et al., "Towards a large-scale recording system: Demonstration of polymer-based penetrating array for chronic neural recording", 2014 36th Annual International Conference of the IEEE Engineering in Medicine and Biology Society, Aug. 26-30, 2014; 2014; pp. 6830-6833., pp. 6830-6834.

Trainham, James A, et al., "A Flow-Through Porous Electrode Model: Application to Metal-Ion Removal from Dilute Streams.", Journal of The Electrochemical Society 1977, 124 (10), 1528-1540., 1977, pp. 1528-1540.

Vatistas, N., et al., "Mass-Transfer Study of the Carbon Felt Electrode", Electrochimica Acta 1991, 36 (2), 339-343, pp. 339-343.

Vedharathinam, V., et al., "Using a 3D Porous Flow-Through Electrode Geometry for High- Rate Electrochemical Reduction of $CO_2$ to CO in Ionic Liquid", Acs Catalysis 2019, 9 (12), 10605-10611, pp. 10605-10611.

Weber, A., et al., "Redox flow batteries: a review", Journal of Applied Electrochemistry 2011, 41 (10), 1137-1164, pp. 1137-1164.

Wilson, E., et al., "Liquid Mass Transer at Very Low Reynolds Numbers in Packed Beds", Industrial & Engineering Chemistry Fundamentals 1966, 5 (1), 9-+., pp. 9-+.

Wong, A., et al., "Direct visualization of electrochemical reactions and comparison of commercial carbon papers in operando by fluorescence microscopy using a quinone-based flow", Selected Proceedings From the 231st Ecs Meeting 2017, 77 (11), 153-161., pp. 153-161.

Zenyuk, I., et al., "Gas-diffusion-layer structural properties under compression via Xray tomography.", Journal of Power Sources 2016, 328, 364-376., pp. 364-376.

Yang et al. "Numerical Simulation of Turbulent Flow and Heat Transfer in a Three-Dimensional Channel Coupled with Flow Through Porous Structures," Transport in Porous Media, Jan. 3, 2018, Springer + Business Media B.V.

\* cited by examiner

INERTIALLY ENHANCED MASS TRANSPORT USING POROUS FLOW-THROUGH ELECTRODES WITH PERIODIC LATTICE STRUCTURES

CROSS-REFERENCE TO RELATED APPLICATIONS

This patent document claims priority to, and the benefit of, U.S. Provisional Patent Application No. 63/160,197 entitled "INERTIALLY ENHANCED MASS TRANSPORT USING POROUS FLOW-THROUGH ELECTRODES WITH PERIODIC LATTICE STRUCTURES" filed on Mar. 12, 2021. The entire content of the aforementioned patent application is incorporated by reference as part of the disclosure of this patent document.

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

This patent document relates to electrodes for electrochemical reactors.

BACKGROUND

Electricity generated from renewable energy sources is becoming cheaper and more abundant, but intermittency and excess capacity leads to its inefficient utilization, slowing technology development and further adoption. Grid-scale energy storage driven by redox flow batteries (RFBs) and related technologies offers a potential solution, but despite recent advances, power performance per unit cost is still not competitive. An interesting alternative approach seeks to immediately repurpose electricity to drive chemical manufacturing with electrochemical synthesis reactors. Excess capacity which would otherwise be curtailed is instead shunted to the manufacture of valuable feedstocks. An especially elegant embodiment of this idea creates fuel directly from $CO_2$ simultaneously storing energy while reducing a principal greenhouse gas.

Across these technologies, energy efficient performance at high currents is a key driver for cost competitiveness. This translates to greater power densities in RFBs and fuel cells and greater productivity in electrochemical reactors. An ubiquitous reactive component in these applications is the porous FTE. Porous FTEs find application across liquid type electrochemical reactors including RFBs, microfluidic fuel cells, water purification cells and electro-organic synthesis reactors. Commonly used electrodes for these cells are carbon-fiber based felts, foams and papers consisting of microfibers ($\approx$5-10 µm in diameter) consolidated into disordered coherent freestanding layers with various types of microstructure depending on the manufacturing process. Although some structures perform better than others, the optimal geometries are not known nor are obvious criteria to further increase performance.

Electrochemical reactors utilizing flow-through electrodes (FTEs) provide an attractive path toward the efficient utilization of electrical energy, but their commercial viability and ultimate adoption hinges on attaining high currents and power densities to drive cost competitiveness. Conventional FTEs provide limited opportunity for architectural control and engineering of microscale transport. New design techniques and devices are needed to improve performance and reduce cost.

SUMMARY

The disclosed flow-through electrodes (FTEs) are engineered to include high active surface area, high conductivity, and high permeability to minimize charge transfer resistance, ohmic losses and concentration overpotential, respectively. At high currents, the latter becomes evident as the system becomes mass transport limited, and the limiting current is dictated by the overall mass transfer coefficient. Previously, the adverse relationship between permeability and surface area has prevented the engineering of the microstructure. The high permeability needed to increase mass transfer rates leads to a decrease in the hydrodynamically accessible surface area.

Disclosed are porous FTEs and techniques for designing porous FTEs with periodic lattice structures with mesoscopic length scales that lead to an increase in the mass transfer including the mass correlation exponent as inertial flow effects dominate. The inertially enhanced mass transport of the disclosed devices which can be 3D-printed are 10×-100× better than previous devices.

In one aspect, an electrode apparatus is disclosed. The apparatus includes one or more fiber layers. Each fiber layer includes a plurality of fibers oriented to be orthogonal to a flow direction of a fluid, wherein the plurality of fibers are configured to cause an inertial flow of the fluid around the plurality of fibers at a first flow rate of the fluid.

The following features can be included in various combinations. The oriented plurality of fibers and the first flow rate of the fluid causes the inertial flow of the fluid generate an increased mass transfer at the plurality of fibers compared to a lower flow rate than the first flow rate. The inertial flow is generated at flow rates greater than or equal to the flow rate and a creeping flow is generated at flow rates less than the selected flow rate. Each of the plurality of fibers has a predetermined cross-sectional shape. The cross-sectional shape is circular, circular convex back with concave sides, circular concave back with convex sides, or circular concave back and sides. The cross-sectional shape is square, square convex back, square concave back, square concave back and sides, or square concave back with convex sides. The cross-sectional shape has a plurality of sharp edges. The plurality of fibers are oriented to produce a face centered cubic (FCC) structure. The inertial flow is characterized by a Reynolds number greater than 1. The inertial flow comprises one or more of: an eddy flow; a recirculating flow; a secondary flow; or a recirculation bubble. The plurality of fibers are arranged to maximize a wake behind each of the plurality of fibers in the flow direction. Each of the one or more layers are configured to produce an unperturbed flow farther in the flow direction. The device is fabricated using one or more of: a 3D printing process; a casting process; a molding process; or a photolithography process.

In another aspect, a method of designing a flow through electrode is disclosed. The method includes selecting one or more fibers each with a cross-sectional shape, selecting an orientation of the plurality of fibers relative to a flow direction of a fluid, selecting the fluid, and selecting a first flow rate of the fluid to cause an inertial flow of the fluid around the oriented plurality of fibers.

The following features can be included in various combinations. The selecting one or more fibers each with the cross-sectional shape, the selecting the orientation of the plurality of fibers relative to a flow direction of a fluid, the selecting the fluid, and the selecting a first flow rate of the fluid are performed to generate an increased mass transfer at the plurality of fibers compared to a lower flow rate than the first flow rate. The inertial flow is generated at flow rates greater than or equal to the flow rate and a creeping flow is generated at flow rates less than the selected flow rate. Each of the plurality of fibers has a predetermined cross-sectional shape comprising: a circular shape, circular convex back with concave sides, circular concave back with convex sides, or circular concave back and sides; a square shape, square convex back, square concave back, square concave back and sides, or square concave back with convex sides; or a shape with a plurality of sharp edges. The plurality of fibers are oriented to produce a face centered cubic (FCC) structure. The inertial flow is characterized by a Reynolds number greater than 1. The inertial flow comprises one or more of: an eddy flow; a recirculating flow; a secondary flow; or a recirculation bubble.

DETAILED DESCRIPTION

Figure 1:
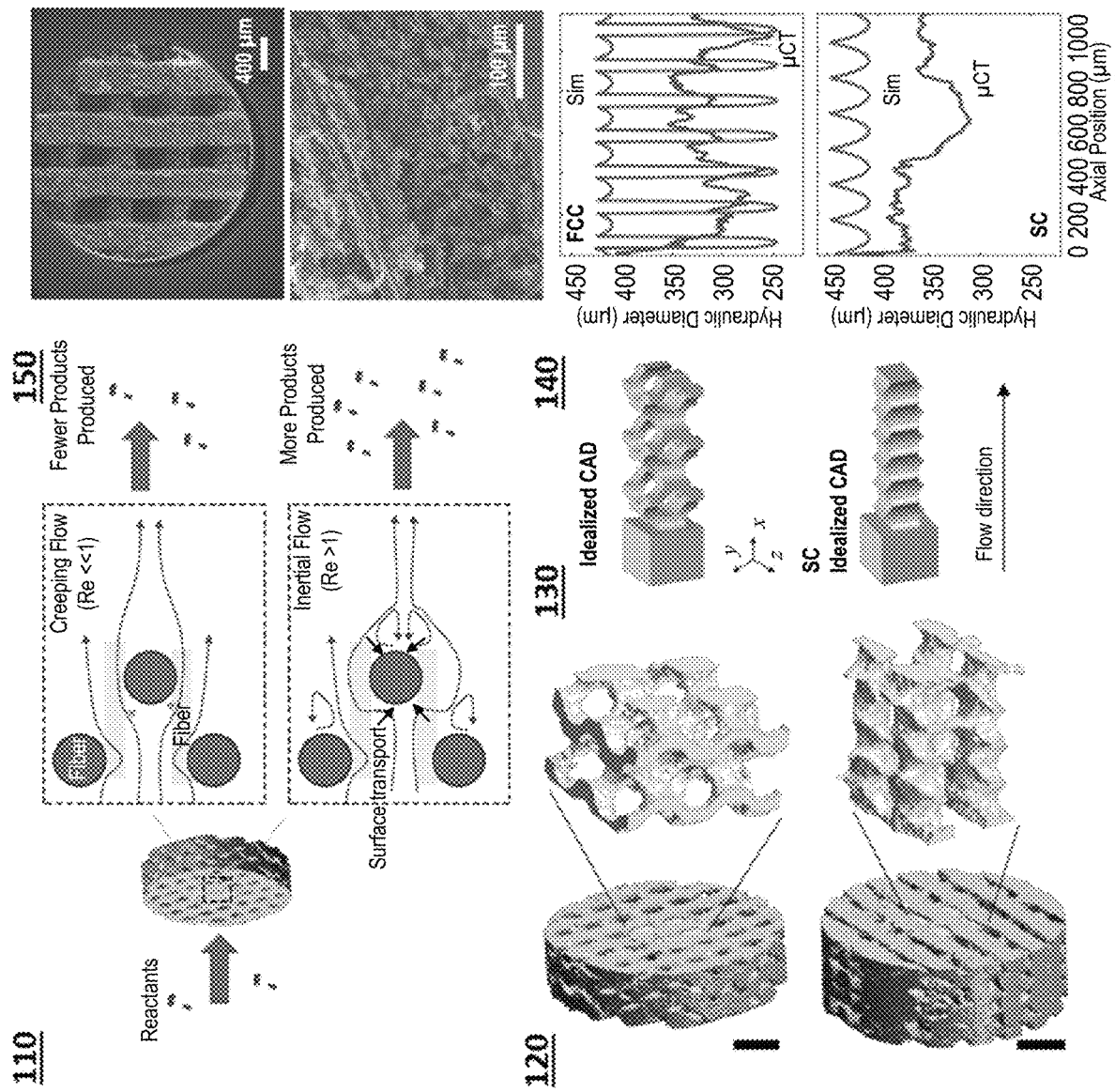
FIG. 1 shows an example structure, morphology, and performance of 3D printed flow through electrodes.

Section headings are used below to aid clarity without limiting the combinations of features that can be combined from the various sections.

The disclosed flow-through electrodes (FTEs) are engineered to include high active surface area, high conductivity, and high permeability to minimize charge transfer resistance, ohmic losses and concentration overpotential, respectively. At high currents, the latter becomes evident as the system becomes mass transport limited, and the limiting current is dictated by the overall mass transfer coefficient. Previously, the adverse relationship between permeability and surface area has prevented the engineering of the microstructure. The high permeability needed to increase mass transfer rates leads to a decrease in the hydrodynamically accessible surface area. Combined experimental and computational modeling approaches for finding an optimal electrode geometry are challenging because of the disordered nature of the fiber structures. Thus, modern strategies to increase mass transport performance have instead focused on assembly level architectures and sophisticated fluid distribution through engineered flow-field plates.

Disclosed are porous FTEs with periodic lattice structures with mesoscopic length scales that lead to an increase in the mass transfer including the mass correlation exponent as inertial flow effects dominate. Described below are devices and validated continuum computation simulations for the mass transfer in 3D printed porous FTEs with periodic lattice structures and show that, in contrast to conventional electrodes, the mesoscopic length scales in 3D-printed electrodes lead to an increase in the mass correlation exponent as inertial flow effects dominate. The inertially enhanced mass transport yields mass transfer coefficients that exceed previously reported 3D printed FTEs by 10×-100×. Due to the internal flow of the disclosed FTEs (e.g., 3D printed FTEs), the disclosed devices exceed the performance of previous materials.

An example design approach employs additively manufactured FTEs to generate controlled, deterministic structures. This enables precise tuning of the local reactive and hydrodynamic environment to attain greater mass transfer while simultaneously providing the versatility for integration/elimination of other cell components (e.g., current collector, flow field, etc).

Described below are the mass transport properties of ordered porous FTEs using both fabricated devices and numerical simulations. Disclosed are the first fabricated 3D porous graphene FTEs. Direct ink writing is used to make ordered simple cubic (SC) and face-centered cubic (FCC) lattice structures with unit cells about two times smaller than previously reported printed FTEs (0.8 mm). The disclosed electrodes attain ~10×-100× larger mass transfer coefficients. As summarized in FIG. 1 at 110, the analysis reveals that this increased performance is due to operation in the inertial flow regime, thus activating secondary flows (e.g., wakes, recirculation, etc.) around electrode features that are otherwise absent in typical electrodes operated in the creeping flow regime. As detailed below, inertial flow enhances surface transport and overall heat transfer coefficients in flow-through electrodes.

FIG. 1 at 110 shows an example structure, morphology, and performance of a 3D printed flow through electrode where reactants are electrochemically converted at limiting current at higher rates when inertia induces secondary flows, as depicted by the recirculating streamlines. FIG. 1 at 120 shows an example of tomographic reconstruction of the 3D printed FCC (top) and SC (bottom) electrode showing an expanded view of a section of the internal void region. Scale bars are 1000 μm. FIG. 1 at 130 shows an example of a CAD representation of the void region with an entrance region added to allow for simulation. FIG. 1 at 140 shows example hydraulic diameters of the tomographically reconstructed geometry (μCT) and the idealized CAD geometry (Sim). FIG. 1 at 150 shows an example SEM of 3D-printed composite graphene aerogel/carbon fiber electrodes.

Also disclosed are design techniques for engineering flow and mass transport in FTEs such as FTEs made using by 3D printing. Reproducible structures were fabricated with predictable mass transfer coefficients. The advantages of 3D printing include deterministic control of architectures, design flexibility to generate near arbitrary structures, and on-demand prototyping, without sacrificing performance.

3D printing as disclosed herein is a viable, versatile rapid-prototyping method for FTEs.

Characterization of the electrode structure. Some example 3D printed electrodes were tomographically imaged. Shown in FIG. 1 at 120 are example reconstructed surfaces for both the simple cubic (SC) and face centered cubic (FCC) electrodes. For the SC structure, the void volume is composed of a large bundle of channels with corrugated surfaces aligned in the axial direction (x direction, also the print and flow direction). Smaller channels (<10) can occasionally connect the larger tubes, but the larger channels are otherwise hydrodynamically disconnected. If the printed filament were completely rigid, it would be expected that the final structure would resemble a stack of fibers and that the interconnecting channels would be larger. Printed inks are soft and slump into one another, causing most of these channels to close. The tomography of the FCC structure reveals a different geometry. The void paths are interconnected throughout the electrode. In FIG. 1 at 130, the representations composed of constant diameter, overlapping fibers for the SC and FCC electrode are shown. The CAD models of the void volumes serve as the input to simulations. Tomography indicates that these structures are distorted FCC and SC lattices.

TABLE 1

Electrode structure characterization and comparison to CAD model

|  | SC | | | FCC | | |
| --- | --- | --- | --- | --- | --- | --- |
|  | Exp | CAD | Diff | Exp | CAD | Diff |
| Area/volume (1/m) | 2989 | 3424 | 14.5% | 4473 | 4805 | 7.42% |
| Porosity | 0.223 | 0.305 | 36.8% | 0.245 | 0.278 | 13.5% |

The hydraulic diameter ($d_h$=4 Void Area/Wetted Perimeter) in planes perpendicular to the flow axis is presented in FIG. 1 at 140 and reveals the characteristic flow path length scale of the electrodes is 250-450 μm, an order of magnitude larger than prevalently used electrode materials like carbon papers and felts. The periodicity of the void region is evident in the CAD modeled structure, but the signal is weaker when measured for the experimental system.

The surface area per volume, a, and porosity, $\epsilon$, are computed from the tomography and CAD as presented in Table 1. The electrodes are lower porosity and have lower intrinsic surface area compared to conventional flow-through electrodes materials. This is expected, as the printing length scale in this manuscript is an order of magnitude larger than the typical fiber lengths scales observed in carbon felts, foams and papers. The CAD model is in agreement with the fabricated FCC and FC electrodes.

Example scanning electron micrographs of 3D-printed FTE are shown in FIG. 1 at 150 and reveal that the surfaces of the electrodes are rough and composed of graphene sheets with embedded carbon fibers.

Measurement of limiting currents. Electrodes were tested in potassium hexacyanoferrate (II) solutions of various concentrations in 1M KCl supporting electrolyte. Cyclic voltammograms under no flow conditions for 3D-printed graphene electrodes show current peaks indicative of switching from kinetically controlled regime to mass transport-controlled regime under diffusional mass transport FIG. 6 at 610-620. Oxidation peak currents increase roughly linearly with solution concentration in agreement with first-order kinetics of one electron transfer ferrocyanide oxidation reaction: $Fe(CN)_6^{4-} \rightarrow Fe(CN)_6^{3-} + e^-$.

Figure 6:
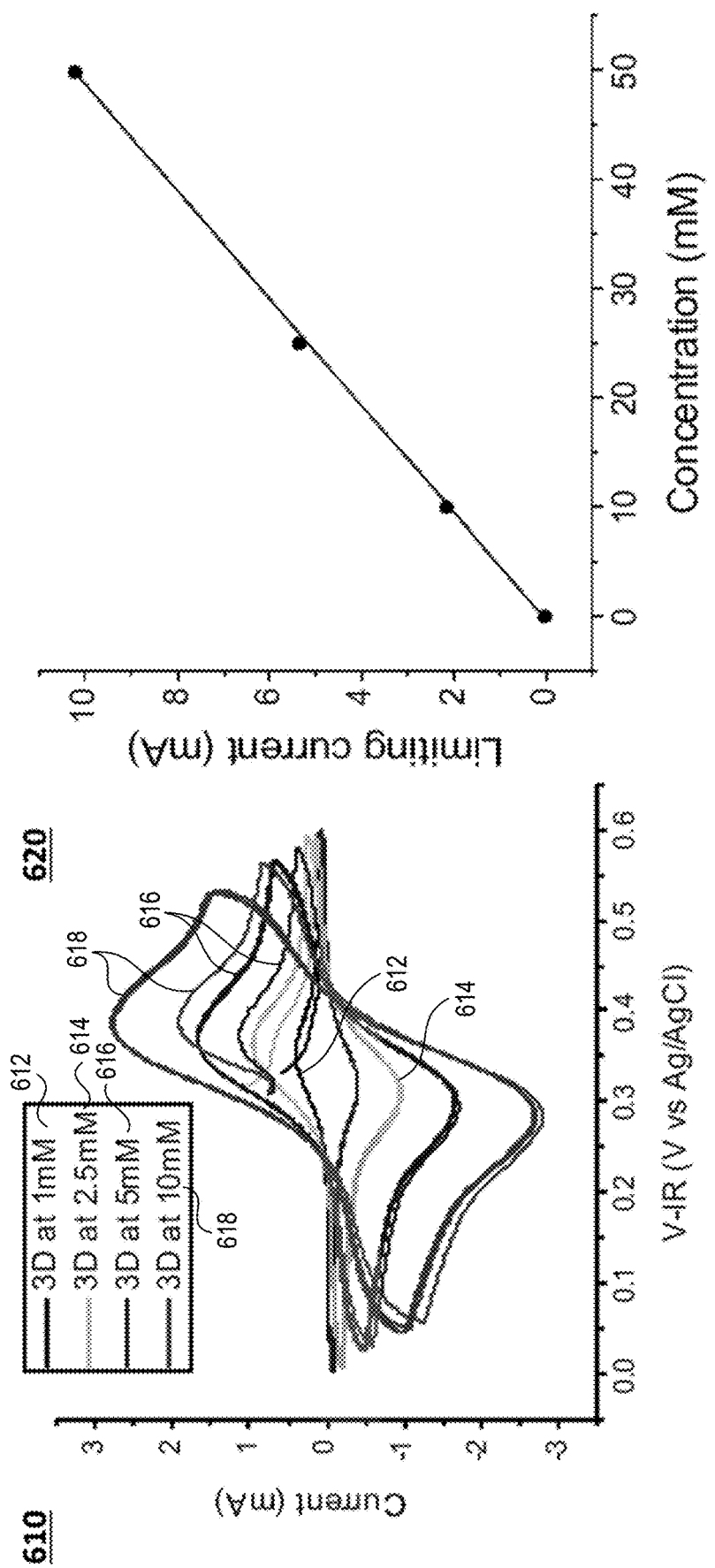
FIG. 6 shows example cyclic voltammetry curves under no flow conditions at various concentrations and examples of limiting currents measured with through 3D-printed graphene electrode with SC geometry.

FIG. 6 at 610 show example cyclic voltammetry curves 612-618 under no flow conditions at various concentrations of Potassium hexacyanoferrate (II) in 1M KCl measure on 3D printed graphene electrode with SC structure. FIG. 6 at 620 shows examples of limiting currents as a function of Potassium hexacyanoferrate (II) concentration in 1M KCl measured with through 3D-printed graphene electrode with SC geometry under flow rate 3 ml/min.

Figure 7:
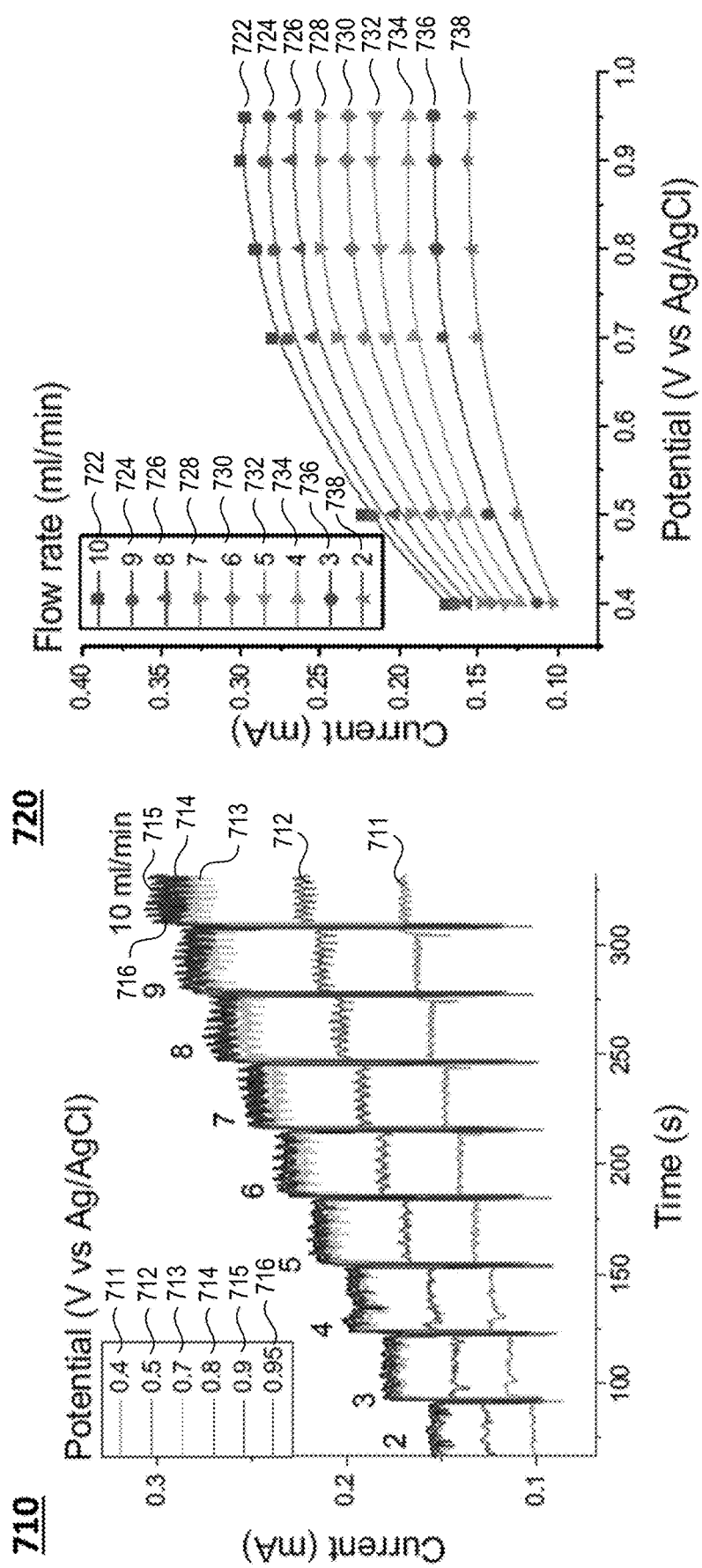
FIG. 7 shows example chronoamperometry curves and example steady state voltammetry curves reconstructed from chronoamperometry.

FIG. 7 at 710 show example chronoamperometry curves 711-716 measured while flowing Potassium hexacyanoferrate (II) (1 mM solution in 1M KCl) at various flow rates through a 3D-printed graphene electrode with SC geometry held at a fixed potential. FIG. 7 at 720 shows example steady state voltammetry curves 722-738 reconstructed from chronoamperometry.

Steady state voltammograms measured under the flow of solutions show current plateaus indicative of mass transport limiting regime under diffusion-convection mass transport (examples of raw data and reconstructed voltammograms are shown in FIG. 7 at 710 and 720, respectively). Limiting currents measured in solutions with different concentrations of potassium hexacyanoferrate were found to scale linearly with concentration (FIG. 8) in agreement with first-order kinetics, therefore mass transport properties were studied at one fixed reactant concentration chosen to be low to minimize IR drop. For the statistical analysis of mass flow performance two sets of identically made SC and FCC lattice electrodes (N=9 electrodes for FCC set and N=7 electrodes for SC set) were prepared and measured at the same concentration (1 mM potassium hexacyanoferrate (II) solutions in 1M KCl) under flow rates 2-200 ml/min and limiting current plateau values are shown in FIG. 2 at 210.

Figure 2:
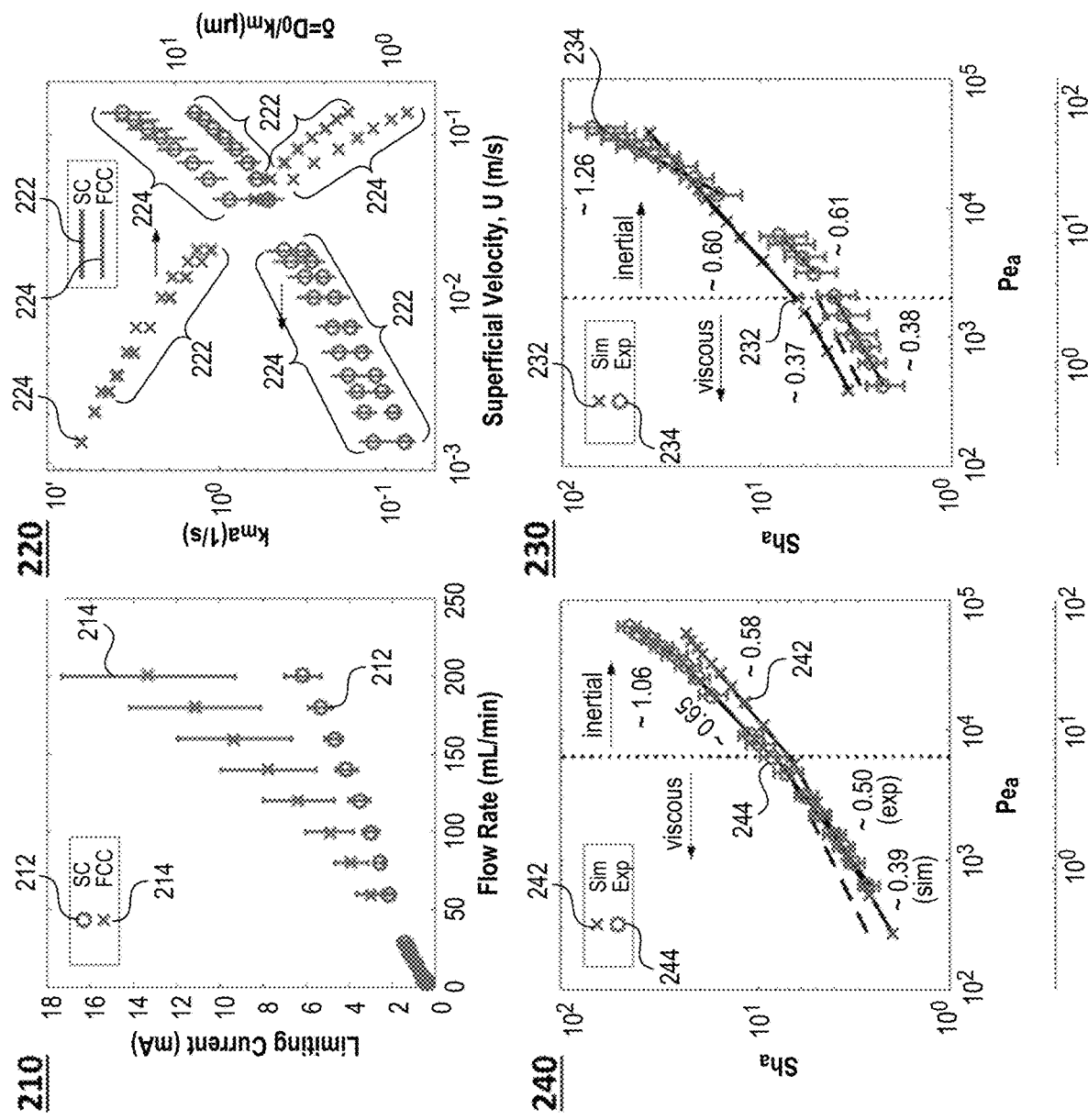
FIG. 2. shows an example of mass transport in 3D printed electrodes.

FIG. 2 at 210 shows an example of mass transport in 3D printed electrodes with limiting current in the SC electrodes at 212 and the FCC electrodes at 214 against the imposed flow rate. FIG. 2 at 220 shows an example of mass transfer coefficients (left-axis) and boundary layer thickness estimate (right-axis) for the FCC at 224 electrodes and the SC electrodes at 222 are plotted as a function of superficial velocity. The mass transfer coefficients are transformed into the Sherwood number experimental data at 230 for FCC with 232 showing simulation results and 234 showing experimental data. FIG. 2 at 240 shows SC simulation results at 242 and experimental data at 244. The solid lines are power law fits to the data with the exponent as labeled in the plot. The dashed lines in FIG. 2 at 230 and FIG. at 240 are the correlations in Eq. 4 and Eq. 5, respectively.

Analysis of mass transfer coefficients. Experimental results are compared to resolved simulation of the convection-diffusion equations, Eq. 6-7, at the limiting current. In the simulations, a local mass transfer coefficient from the bulk to the surface at downstream position x is defined by performing a differential species balance in the flow direction, $$k_m(x) = \frac{\langle c \rangle_v}{\langle -D_0 \vec{n} \cdot \vec{\nabla} c \rangle_s} \qquad \text{Eq. [1]}$$

where $\langle * \rangle_v$ is the velocity weighted average concentration, c, in planes perpendicular to the flow direction (i.e., y, z directions), $\langle * \rangle_s$ is the surface average along the intersection of the plane and fiber surface, and $D_0$ is the diffusivity of $Fe(CN)_6^{4-}$. In the absence of dispersion, the local mass transfer coefficient is averaged to determine the overall or volumetrically averaged mass transfer coefficient:

$$k_m a = -\frac{U}{L} \log\left(1 - \frac{I_{lim}}{nFQc_b}\right) \qquad \text{Eq. [2]}$$

where $I_{lim}$ is measured limiting current, n is the number of electrons transferred in the reaction, F is Faraday's constant, Q is the imposed flow rate (i.e., Q=superficial velocity*frontal area=U*A), and L is the length of the electrode. From this expression it is clear that electrodes with larger mass transfer coefficient lead to higher limiting currents and productivities.

Scaling analysis reveals operational regimes with enhanced mass transport. Using Eq. 2, the limiting current data in FIG. 2 at 210 is transformed into the overall mass transfer coefficient, $k_m a$ and plotted as a function of the superficial velocity in FIG. 2 at 220. The mass transfer coefficient is extracted using the tomographically determined values of the surface area per volume in Table 1. The ratio of the diffusivity to the mass transfer coefficient ($D_0/k_m$) provides an estimate of the mass transfer length scales, yielding a range from ≈1 μm at high flow rates to ≈50 μm at lower flow rates as shown in FIG. 2 at 220. As expected for high Schmidt number (Sc) flows, the mass transfer boundary layers are generally much thinner than the geometric features. This implies that architected features above these lengths will negligibly impact the mass transfer coefficients. However, this inherently assumes slow flow predominantly parallel to internal surfaces. As explored below, higher flow rates and larger features increase the fluid inertia and dramatically alter the flow field in the vicinity of the surface, strongly disrupting the very thin mass transport boundary layers.

In FIG. 2 at 230 and 240, the mass transfer coefficients are scaled using the porous electrode Sherwood number, $$Sh_a = \frac{\epsilon k_m}{aD_0}, \qquad \text{Eq. [3]}$$

and plotted for both the experiment and computation. The data is fit to power-law functions of the form $Sh_a = CPe_a^\alpha$. Larger exponents lead to enhanced mass transport and transitions between exponents demarcate operational regimes. Three distinct mass transport regimes, characterized by increasing exponent, are observed as the flow rate is increased (equivalently Pea or Re) for both the SC electrode, where a increases from 0.50 to 1.06, and FCC electrode, where a increases from 0.38 to 1.26. These slope changes are due to a change in the underlying transport mechanism driven by the system hydrodynamics. This reveals an underutilized opportunity to engineer flow through electrodes for improved mass transfer performance.

Inertially driven secondary flows enhance mass transport in FCC electrodes. From FIG. 1 at 120 and 130 it is evident that the flow paths in the FCC electrodes are interconnected and result from flow around overlapping fibers. The hydrodynamic behavior is thus characterized using the fiber length scale. For the FCC system, the Reynolds number is defined as $Re_f = \rho U d_f / \mu$.

The first mass transfer regime in FIG. 2 at 240 is characterized by an experimentally determined value of $\alpha = 0.38$ for $Re_f \lesssim 3$. The agreement between simulation and experiment is excellent. These results are compared to a commonly used correlation for the mass transfer coefficient in porous media, $$Sh_a = \frac{0.330}{(1-\epsilon)^{\frac{2}{3}}} Pe_a^{\frac{1}{3}} \qquad \text{Eq. [4]}$$

and found to be in close agreement with the data even though this correlation is only expected to be accurate for $0.35 < \epsilon < 0.75$. The $\alpha = 1/3$ exponent is typical of mass transfer in viscous, creeping flow including fibers in porous media. The observed exponent is in near agreement with recent simulations for mass transfer in the viscous regime ($Re_f < 1$) for carbon felts ($\alpha = 0.402$) and papers ($\alpha = 0.432$).

Figure 3:
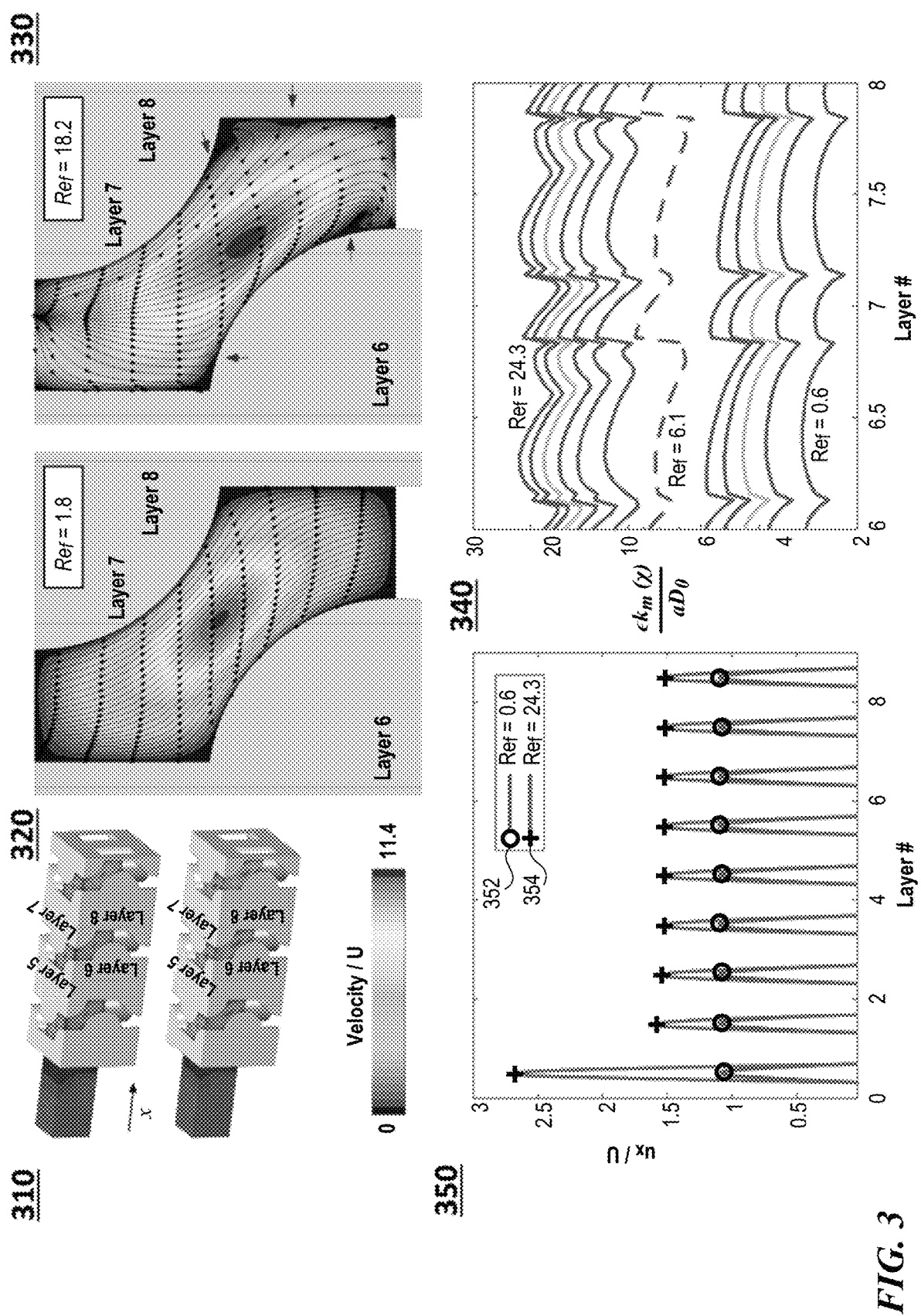
FIG. 3 shows an example of local analysis of a face centered cubic (FCC) electrode.

At higher flow rates, the power-law exponent increases to $\alpha = 0.60$ and $\alpha = 0.61$ for the simulation and experiment, respectively, and are again nearly identical. The increase in power-law exponent signals a change in the underlying transport mechanism and coincides with $Re_f \lesssim 3$, revealing that fluid inertia is important. The transition to inertial flow coincides with the expected transition for a single cylinder in cross flow (i.e., $Re_f \approx 1\text{-}10$). As with a single fiber, comparison of FIG. 3 at 320 and 330 shows that for flow rates where $Re_f \lesssim 3$ secondary flows, defined as flows which strongly deviate from the expected parallel flow paths that are expected for creeping or potential flows, emerge in the interior of the electrode. Larger wakes, recirculation bubbles and corresponding surface stagnation lines appear in the inertial flow regime, and the location of these regions coincides with the position of new local maxima in $Sh_{a,loc}$, as seen in FIG. 3 at 340. Note that entrance effects are minimally important, as even at the highest simulated flow rate, $Re_f = 24$, the flow is fully-developed after approximately 2.5 layers as shown in FIG. 3 at 350.

FIG. 3 at 310 shows example local analysis of an FCC electrode where symmetry is used to simulate a quarter of the FCC domain. The solid is gray. The velocity magnitude is shown at $Re_f = 1.8$ (top) and $Re_f = 18.2$ (bottom), and a detailed view of the streamlines is shown in FIG. 3 at 320 and 330, respectively. The arrows show the emergence of surface stagnation lines. The bar shows the velocity magnitude normalized by the superficial velocity. FIG. 3 at 340 shows an example of the local mass transfer coefficient from Eq. 1 is plotted in the axial direction. The curves correspond to the simulation points from FIG. 2C and are in ascending $Re_f = 0.6$ to 24.3. The dashed line corresponds to $Re_f = 3.0$, the first curve in the inertial regime. The highlighted curves correspond to $Re_f = 18.2$ (top) and $Re_f = 1.8$ (bottom). FIG. 3 at 350 shows the velocity in the axial direction along a line down the center of the quarter domain in the axial direction at the extremes of the simulated Re f with $Re_f = 0.6$ at 352 and $Re_f = 24.3$ at 354.

The enhanced mass transfer seen in FCC electrodes is engineered by controlling the secondary flows and is only accessible when $Re_f$>1. The secondary flows lead to the emergence of surface stagnation lines and increased surface strain rates in the adjacent regions, a principal driver of increased mass transfer for very thin boundary layers. The flow near the stagnation lines now has a significant component perpendicular to the fiber surface and convection becomes a dominant transport mechanism orthogonal to the surface. Inertial flows are difficult, if not impossible, to realize in conventional, fibrous electrode materials like carbon felts due both to the small lengths scale, which preclude operation at large Re, and the random arrangement of the fibers. In the viscous flow regime, the impact from the random orientation is small, but in the inertial regime any flow along the fiber axis will diminish the occurrence of secondary flow. In contrast, the FCC electrodes orient all fiber axes orthogonal to the incoming flow, allowing for maximal wake formation behind the fiber, and are ordered, preventing fibers from overly shielding incoming flow and thus maximizing the prevalence of secondary flows around the fibers (see FIG. 9).

The experimental data in FIG. 2 at 240 reveals a third mass transport regime beyond $Re_f \approx 20$. This deviates significantly from the simulation data, despite the good agreement at lower values. Turbulence in the electrodes is not a factor, as $Re_f$<<1000, but the flow can become unsteady. One time-dependent simulation was performed over an extended periodic domain and found that the flow becomes unsteady at $Re_f \approx 60$. This value is in approximate agreement with the onset for vortex shedding for a single cylinder in cross-flow. Though the flow is unsteady, there is no observed impact on the power-law exponent of the simulation and mixing due to unsteady flow is ruled out as a mechanism for increasing mass transfer to the surface. Mixing induced by unsteadiness may become more important when enhancing mass transfer in systems that undergo high reactant conversion since this will significantly increase flow-induced dispersion. Alternatively, at the highest flow rates the boundary layers is expected to be ~1 µm, and this may approach the surface roughness of the fibers (c-f. FIG. 1 at 150). The boundary layer thickness, however, would need to be significantly smaller than the surface roughness length scale to impact mass transfer. Given that simulation reveals no mechanism for enhanced transfer from the interior of the electrode, the further enhancement in the third regime is hypothesized to arise from transfer on the front of the electrode. Indeed larger $\alpha$~1 are often observed for impinging flow.

Inertially driven developing flow enhances mass transport in SC electrodes. As seen in FIG. 1 at 120 and 130, the geometry of the SC electrode is equivalent to a non-hydrodynamically communicating tube bundle of irregular cross-section embedded in a solid matrix. A model for the mass transfer in the bundle is constructed by geometrically scaling the analytical results for the average mass transfer coefficient for completely developed flow in a single tube:

$$Sh_a = 0.641 \left( Pe_a \frac{d_h}{L} \right)^{\frac{1}{3}} \qquad \text{Eq. [5]}$$

where the SC CAD data from FIG. 1 at 150 is used to determine the average value for the hydraulic diameter dh. For flows in tube-like structures the Reynolds number is defined, $Re_{dh} = \rho U d_h/\mu$.

The experimental data in FIG. 2 at 230 shows that $Sh_a$ undergoes three slope changes, with increases from $\alpha$=0.50 to $\alpha$=0.65 at $Re_{dh} \approx 10$ and then to $\alpha$=1.06 at $Re_{dh} \approx 40$. In the first region, where $Re_{dh}$<10, the experiment and simulation are both in close agreement with the correlation, as expected since the correlation applies for fully-developed flow. There is some expected disparity between the power-law slopes of the experiment, correlation, and simulation, as the geometry deviates slightly between the three domains. In this regime, the mass transfer behavior of the SC electrodes is closest to low Re, creeping flow mass transfer, as additionally reflected by an exponent near $\alpha$=⅓ and agreement with the predicted values from Eq. 5. The SC electrode offers no mass transport enhancement in this regime.

Figure 4:
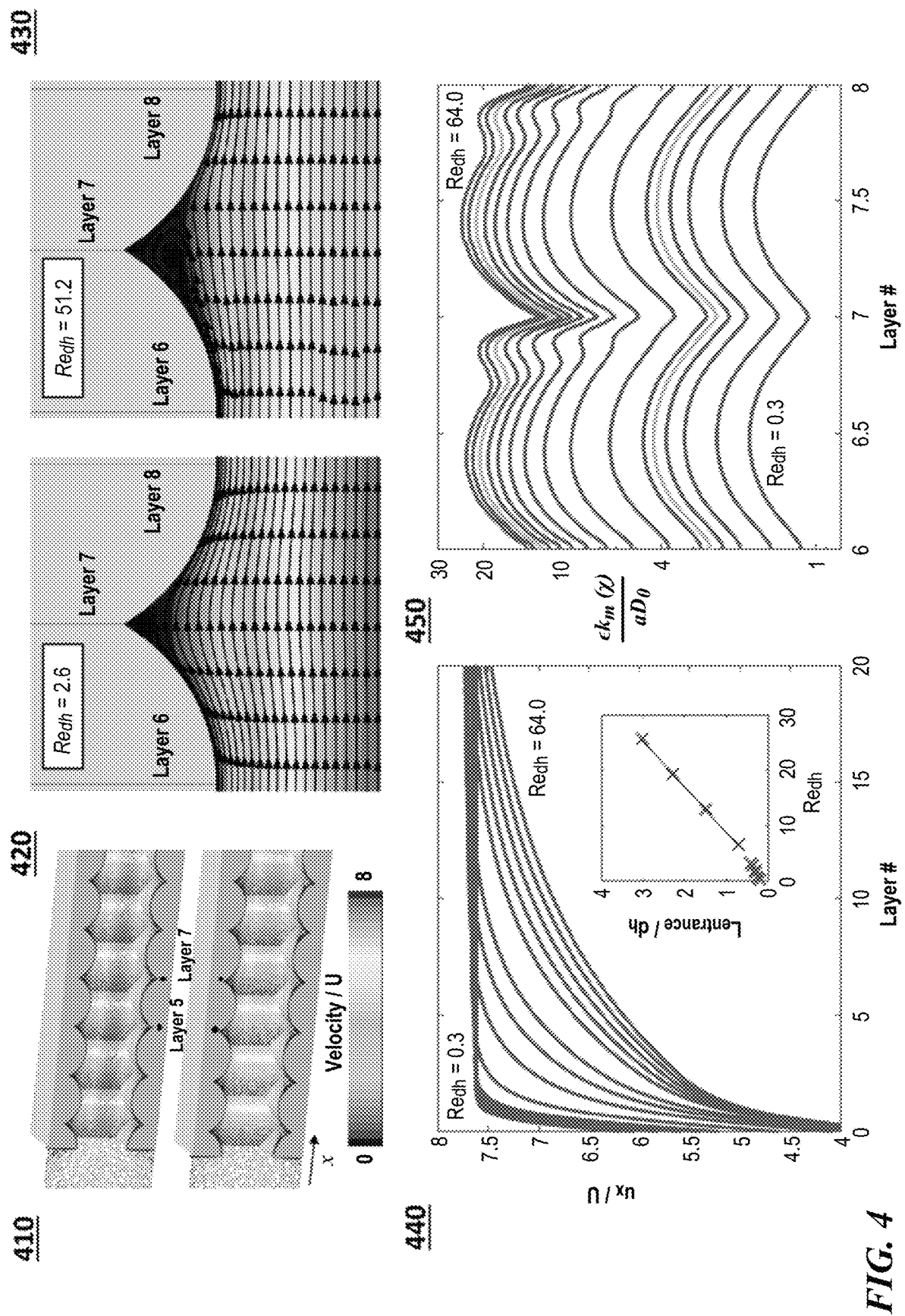
FIG. 4 shows an example of local analysis of a simple cubic (SC) electrode.

Alternatively, the experimental and simulation data both show an increase in the power-law exponent at $Re_{dh} \approx 10$, signaling a mass transfer enhancement and a change in the underlying transport mechanism. FIG. 4 at 410 shows that as the flow rate is increased, the flow field develops over a greater distance. The latter is evident in the plot of the centerline velocity magnitude of the flow field as shown in FIG. 4 at 440. The position at which the centerline velocity reaches 95% of its plateau value is defined as the entrance length and plotted against $Re_{dh}$. The linear dependence of entrance length with $Re_{dh}$ is analogous to the same phenomenon in circular tubes and it is observed that the flow is fully developed throughout the SC electrode when the entrance length is smaller than the hydraulic diameter, $Re_{dh}$<10.

FIG. 4 at 410 shows example local analysis of an SC electrode with visualization of the modeled SC domain with solid in grey. The velocity vectors are shown for developed flow at $Re_{dh}$=2.6 (top) and developing flow at $Re_{dh}$=51.2 (bottom), and a detailed view of the streamlines is shown in FIG. 4 at 420 and 430, respectively. The colorbar shows the velocity magnitude normalized by the superficial velocity. FIG. 4 at 440 shows an example of the velocity in the axial direction along a line down the center of the domain for all simulated $Re_{dh}$. The inset shows the flow development entrance length dependence on $Re_{dh}$. FIG. 4 at 450 shows an example of the local mass transfer coefficient from Eq. 1 is plotted in the axial direction. The curves correspond to the simulation points from FIG. 2 at 240 and are in ascending $Re_{dh}$=0.3 to 64.0. The highlighted curves correspond to $Re_{dh}$=51.2 (top) and $Re_{dh}$=2.6 (bottom).

The emergence of the momentum boundary layer provides a mechanism to explain the improved mass transport. The surface velocity gradients are greatest, equivalently the momentum boundary layer is the thinnest, when the flow first enters the electrode and slowly decay as the flow develops. In analogy with the FCC electrodes, the increased surface strain rate in the developing region leads to greater local mass transport. This also explains the observed transition in the overall mass transfer coefficient data in FIG. 2 at 230. As the momentum and mass transfer boundary layers begin to co-evolve with position in the tube, high mass transfer rates should occur. Indeed, the simulation and experimental transition coincides with the emergence the entrance length exceeding hydraulic diameter at $Re_{dh} \approx 10$.

Beyond $Re_{dh} \approx 40$ the experimental data shows a further increase of the power-law exponent to $\alpha$=1.0. As with the FCC data, the increase mass transfer is hypothesized to arise from reaction on the front face of the electrode. Interestingly secondary flows, also driven by fluid inertia, emerge in the interior of the electrode as the flow rate is increased as shown in the increased recirculation of the streamlines FIG. 4 at 420 and 430. These lead to new local maxima in the local mass transfer coefficient as presented in FIG. 4 at 450.

Comparing mass transfer coefficients across systems. To enable comparison to a broad set of literature, in FIG. 5 the overall mass transfer coefficients, $k_m a$, of the FCC electrode are compared to previous studies that employed the same chemistry, as the dimensional $k_m a$ will depend on the transport properties of the electrolyte and reactive species. The mass transport coefficient of the FCC and SC electrodes are comparable (c-f. FIG. 2) but the FCC structure has inertially enhanced properties that are not principally driven by the electrode thickness.

Figure 5:
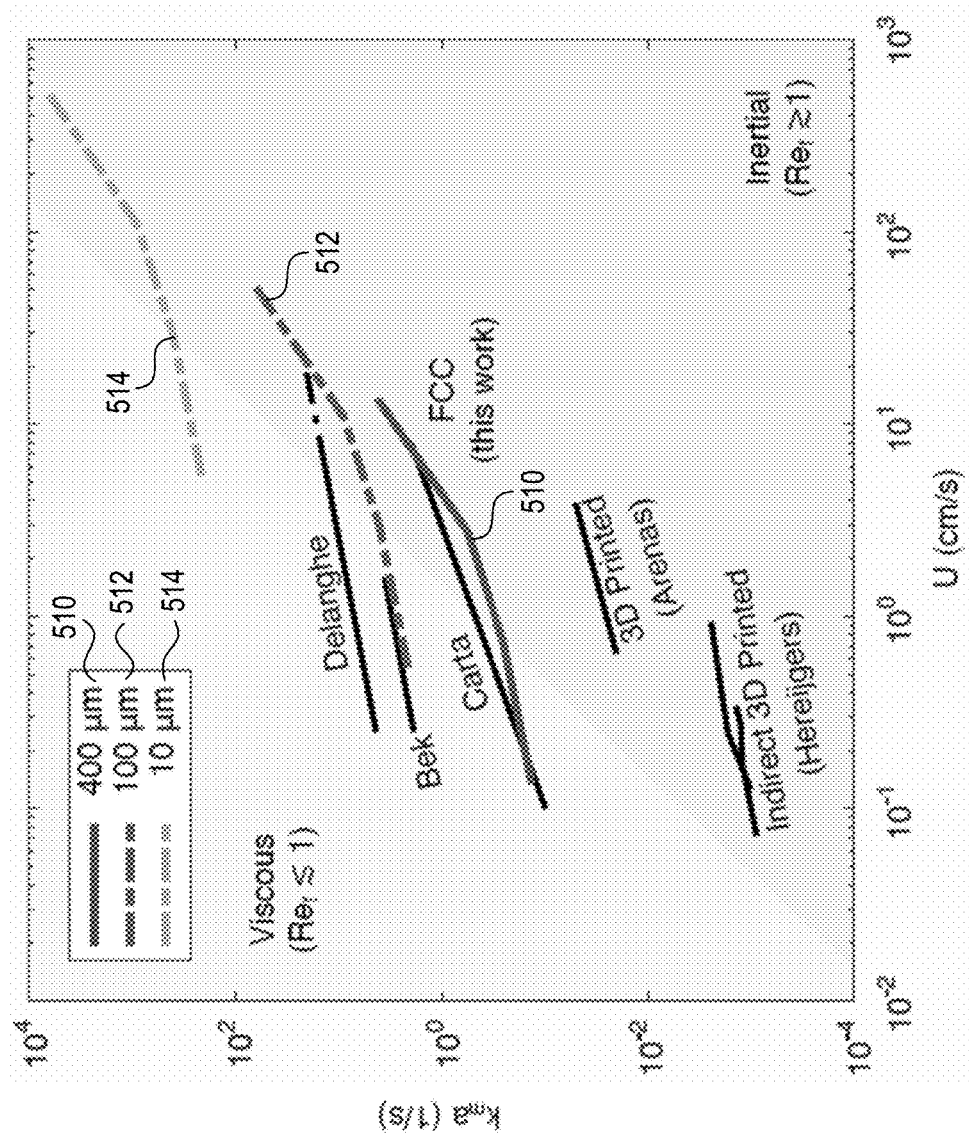
FIG. 5. shows examples of volumetric mass transfer coefficients across systems and length scales as a function of the superficial velocity.

FIG. 5 shows an example of the volumetric mass transfer coefficient across systems and length scales as a function of the superficial velocity. The FCC experimental data is re-dimensionalized and scaled using similitude to determine the expected performance of the electrodes as they are manufactured with fiber diameters of 100 μm at 512 and 10 μm at 514. The 400 μm data at 510 corresponds to power law fits to the experimental FCC data. As the FCC electrode is made smaller, the transition from the viscous to the inertial regime occurs at greater velocities but the mass transfer coefficient increases. The black curves are a comparison to correlations developed by experiments with $Fe(CN)_6^{-3/-4}$ in carbon felt in 3D printed Ni/SS electrodes, and indirect 3D printed electrodes. Another example is extrapolated using a dashed line to the velocity at which the flow transition from viscous flow to inertial flow (i.e., $Re_f=1$). The shaded region shows where the FCC electrodes will operate in the inertial regime. All extrapolations are represented using dashed lines.

At limiting current conditions $k_m a$ controls the electrochemical reactor performance and serves as the metric for comparison while still normalizing for the size of the reactor. In FIG. 5 the FCC electrode mass transfer is compared to measurements in several carbon felt FTEs as these are commercially available, high performance materials that have seen pervasive adoption. The experimental curves in the figure are representative of several studies of ferrocyanide redox reaction in high porosity carbon felts with ~10 μm fiber diameter. Even at length scales that are >40× the carbon felt, the FCC electrode shows comparable performance to the work of Carta et al.

As the flow rate is increased, the FCC electrode crosses into the inertial regime before the carbon felt, leading to a stronger flow dependence for the mass transfer coefficient, and the performance gap relative to the highest observed $k_m a$ from literature is reduced to ≈4×. The carbon felt may also transition to the inertial regime, provided enough of the fibers are oriented orthogonal to the flow and do not suffer from excessive wake interference between the fibers, but this transition will occur at much larger flow rates as shown by the extrapolation in the dashed line. This transition has been previously observed in the fluorescence microscopy of carbon papers.

To understand how the FCC FTEs will perform as printing resolution is increased, dynamic similarity is used to re-dimensionalize the experimental data in FIG. 2 at 240 for smaller length scales as shown in FIG. 5. Mass transfer coefficients for FCC electrodes with 100 μm fibers, merely 4× smaller than what has been produced in this manuscript, will rival the performance of carbon felts and even exceed it as the FCC electrode enters the inertial regime. At the same fiber length scale as the carbon felts 10 μm the FCC electrodes are expected to greatly outperform these materials.

The disclosed electrodes exceed the value of $k_m a$ for previously developed 3D Printed Ni/SS electrodes by an order of magnitude and for 3D electrodes formed using an indirect 3D printing method by two orders. These 3D printed electrodes contain internal feature sizes which could lead to inertial flows at the operational flow rates; however, the obstacles arrangement in these studies may not have maximized this effect.

The disclosed subject matter includes engineered flows enabled by 3D printing that can dramatically enhance mass transfer in flow through electrodes. The key to this high performance is the strong dependence of the mass transport properties on the flow when operating in the inertial regime over the creeping flow regime. Ordered features aligned orthogonal to the flow can be used to induce secondary flows driven by fluid inertia. The near wall flow changes and induced stagnation lines locally increase the surface stain rate and lead to inertially enhanced mass transfer even for very thin concentration boundary layer. Indeed, the mass transfer coefficients reported here exceed those from previous work on 3D printed electrodes by 1-2 orders of magnitude and approach the mass transfer coefficients for electrodes composed of internal features which are 40× smaller. Greater print resolution will continue to increase the performance of the 3D printed electrodes, but appropriate design of larger features may nevertheless lead to superior performance by enabling greater limiting currents. By demonstrating mass transfer performance on par with commonly used electrode materials, 3D printing is shown to be a viable rapid-prototyping method for FTEs, enabling rapid exploration of novel FTE architectures without requiring the expensive development of industrialized manufacturing techniques. Engineered flow in 3D-printed FTEs can be leveraged to significantly boost the performance of electrochemical devices to make them much more attractive solutions to the global energy crisis.

Figure 9:
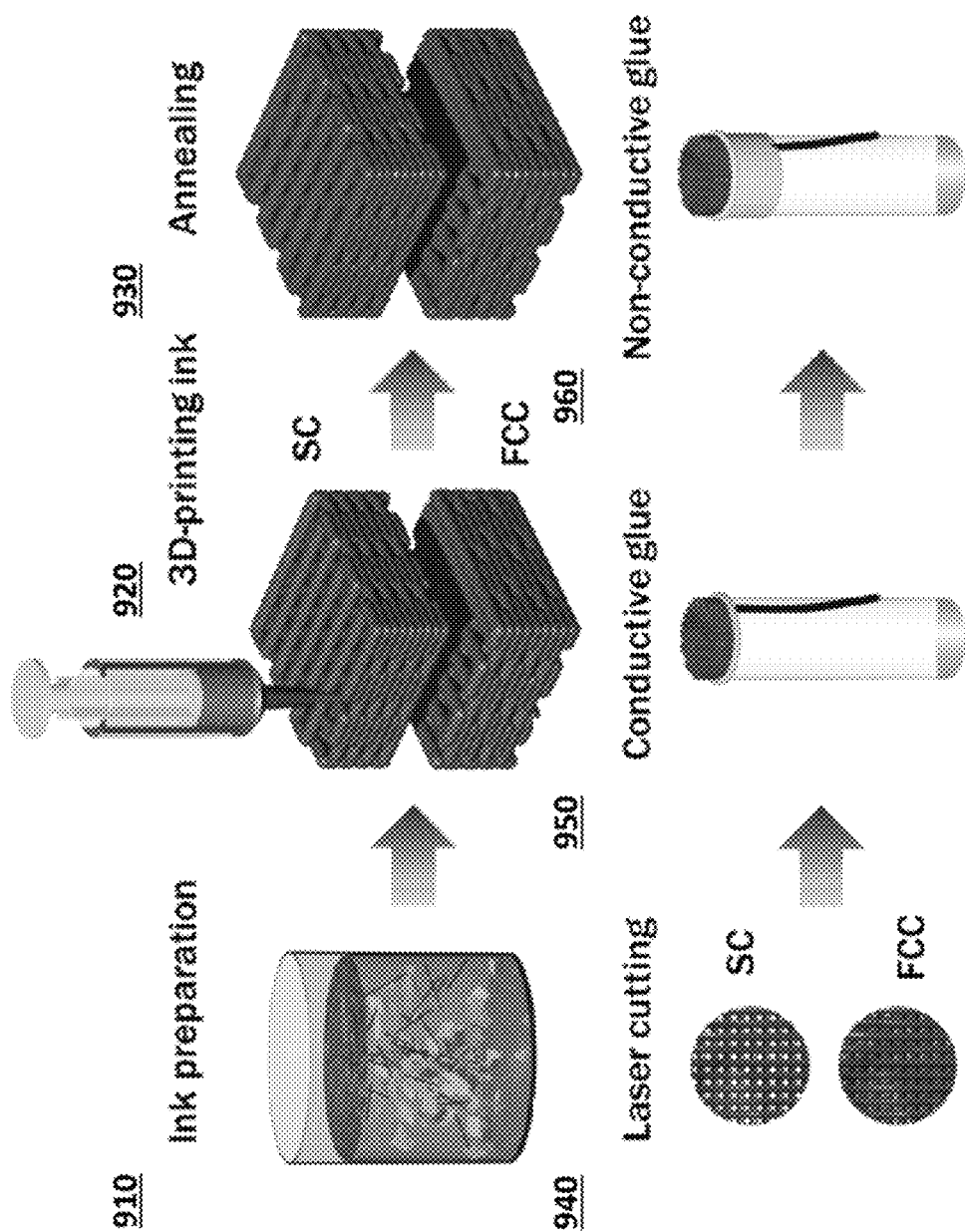
FIG. 9 shows an example preparation of flow through 3D printed graphene electrodes.

Preparation of FTE. 3D printed carbon-based graphene aerogel electrodes were used for the flow tests performed in this work. A schematic of the overall fabrication process is shown in FIG. 9. A thixotropic aqueous graphene oxide ink was formulated for direct ink writing (DIW). DIW is an extrusion process by means of which a thixotropic ink is deposited onto a substrate to fabricate 3D structures. For SC lattices, multiple orthogonal layers of parallel cylindrical rods were printed alternately. Whereas, for FCC lattices an offset of 400 μm was introduced in y and z directions such that every odd layer will cover the gap of an even layer. The printed samples were later freeze-dried and carbonized under inert atmosphere to obtain 3D printed graphene aerogels. A more detailed explanation on the ink formulation, print and other process parameters can be found in the Supporting Information.

For a flow test, circular discs of 5.6 mm diameter were cut using a commercial laser cutter (Universal Laser Systems VLS 3.50, CO2 laser, 50 W) under inert atmosphere. To make an electrical contact to an FTE, a platinum wire (99.99% purity, diameter 0.127 mm, Sigma Aldrich) was hooked to an edge of the glass pipette (5.6 mm inner diameter on average) and conductive carbon epoxy (product AA-CARB 61LP of Atom Adhesives) was distributed as a ring over the edge of the tube. A laser cut disk was placed on top of the tube and the edges were coated with conductive epoxy to improve electrical contact. After drying in an oven at 120° C. for 15-20 minutes, the edges of the electrode, the gap between electrode and glass tube and surrounding Pt wire were coated with non-conductive epoxy (Loctite 9462 Hysol) and dried for another 30 min at 120° C.

Tomography characterization and analysis of 3D geometry. Samples were exposed to iodine prior to tomography measurements to increase contrast of low absorbing carbon materials. Tomography scans were carried out on a Xradia 510 Versa (Carl Zeiss X-ray Microscopy Inc., Pleasanton, CA, USA) 3D x-ray microscope machine with the X-ray source tuned to 80 kV, 7 W without filter. Samples were placed 120 mm from the source and 30 mm from the detector. X-ray radiographies were collected using a 4× objective lens, yielding a pixel size resolution of 5.44 μm/pixel. A series of 2400 projections were obtained over a range 360° range with 5 seconds exposure time.

Tomography reconstructions were performed using XMReconstructor version 5 (Carl Zeiss X-ray Microscopy Inc., Pleasanton, CA, USA), and output volumes were cropped and converted to .tiff format using Avizo Lite v9.5.0. Volumes were rotated and 2D morphological filtering was performed using a dilation disk with 2-pixel radius and resliced from top and left stacks of reconstructed images using MorphololibJ. The two filtered stacks of image were combined using the "max" calculator and resulting volume of filtered using 2D median algorithm. Manual thresholding was performed to differentiate sample from background. The volume was further processed by removing closed pores using the 3D fill holes algorithm. Channels were analyzed by measuring particles ranging from 1,000 to 300,000 μm$^2$ on each slices of the volume. Image processing and analysis was done using Fiji v.1.52p.

SEM analysis. Scanning characterization of 3D-printed electrodes was obtained with a JEOL7401-F SEM at a 5 kV accelerating voltage.

Figure 8:
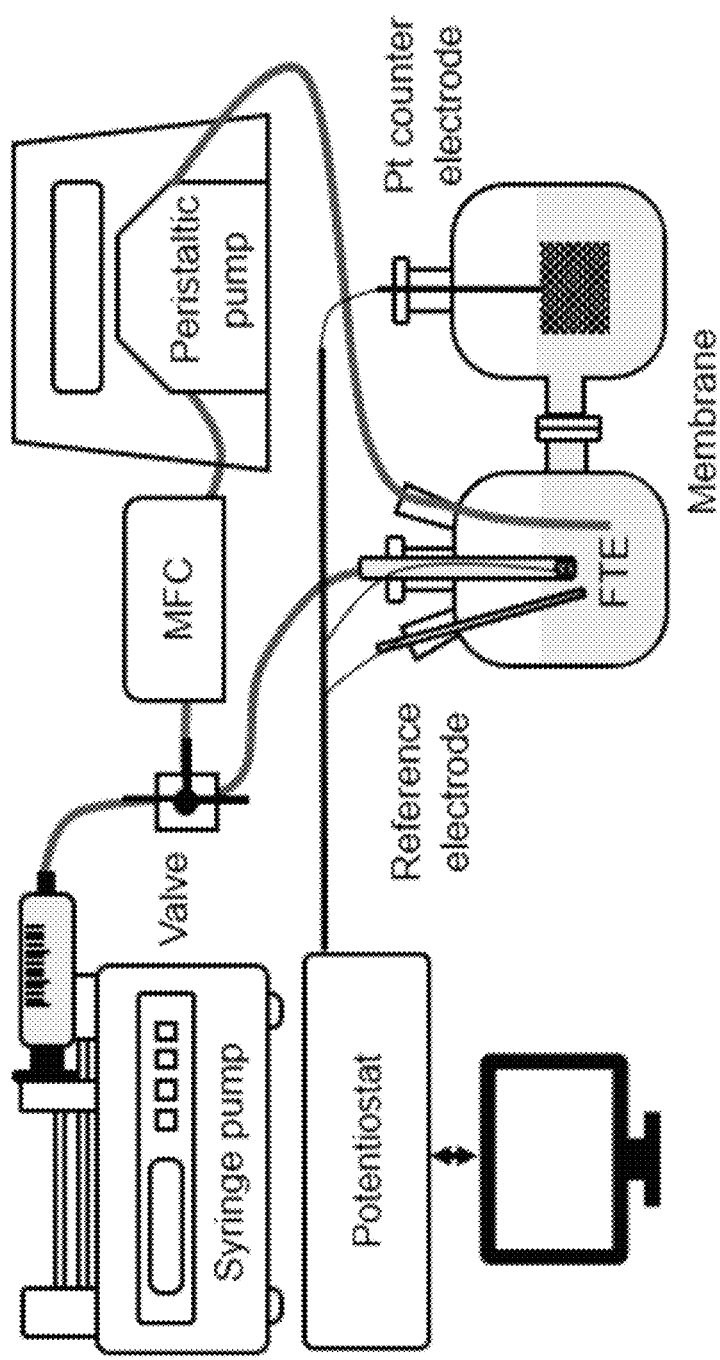
FIG. 8 shows an example of an experimental testing set-up.

Electrochemical measurement setup. Electrodes were tested for potassium hexacyanoferrate (II) oxidation under flow-through conditions inside custom two-compartment cell separated by a Nafion membrane to avoid re-oxidation of species electrochemically generated at the counter electrode (FIG. 8). Large surface area coiled platinum electrode served as a counter electrode and a standard Ag/AgCl electrode used as a reference electrode. Fresh solutions for tests were prepared daily by dissolving potassium hexacyanoferrate (II) trihydrate (99.0% min purity, Sigma Aldrich) in 1M KCl supporting electrolyte. A syringe pump (KDS200, KD Scientific) with 50 mL glass syringe and PTFE tip plunger was used for mass flow control at low flow rates 2-55 mL/min. A peristaltic pump with Iridium liquid flow control system (McMillan Flow Products) was used at high flow rates 60-200 mL/min. Solutions were forced through a glass tube (inner diameter 5.6 mm) with a porous electrode glued at the end with help of syringe pump or peristaltic pump with Iridium liquid flow control system. Parts in contact with solution were made of chemically resistive materials: glass, PTFE and Viton. Electrochemical measurements were performed by SP-300 Potentiostat (Bio-Logic Science Instruments, France). To obtain steady state voltammograms chronoamperometry the following experiments were performed: the potential was changed stepwise and the current at each potential was monitored until steady current was recorded. For limiting current measurement, the potential was increased stepwise with 50 mV steps until steady state current value became insensitive to a potential increase. Potential limits were kept within the water stability window to avoid contribution to the current due to water electrolysis.

Conductivity measurement. Discs with 5.6 mm diameters were extracted from 3D printed SC and FCC samples using a commercial laser cutter (Universal Laser Systems VLS 3.50, CO2 laser, 50 W) for conductivity measurements purpose. Silver epoxy paste was applied on the sample to ensure electrical contact and conductivity measurements were perform using a multimeter. The conductivity, σ, of electrodes was calculated from resistance R as σ=d/AR, where d is sample thickness and A is surface area. The resistance of leads was negligible compared to the resistance of the samples.

Printed structures were characterized for electrical conductivity. The conductivity of 3D printed graphene samples was 2.2±0.3 S/cm independent of lattice type. It is well within the range of the conductivities of the typical carbon-based FTEs and for comparison just 1.7× lower than the conductivity of Segracet 29AA Carbon paper is 3.8 S/cm commonly used in various electrochemical reactors (www.fuelcellstore.com).

Simulations. High resolution, continuum, computational fluid dynamics is used to simulate the flow and mass transport in the lattice geometries and enable direct comparison to the experimentally studied systems. At the limiting current, the surface concentration of the lone reactive species (i.e., $Fe(CN)_6^{4-}$ for oxidation of ferrocyanide) is zero and the electrochemical and electrostatic problems are decoupled. The complete, steady mass transport behavior can be described by two, one-way coupled partial differential equations for the fluid flow field, $\vec{v}$, and species concentration, c. To enable comparison across species and geometries, lengths are made dimensionless with the fiber diameter ($d_f$), timescales with the ratio of the fiber diameter to the inlet flow velocity ($d_f/U$), and concentration with the inlet concentration, $c_b$:

$$Re_f \hat{\nabla} \cdot \hat{\vec{v}} = -\hat{\nabla}\bar{p} + \hat{\nabla}^2 \hat{\vec{v}} \qquad \text{Eq. [6]}$$

$$Pe_f \hat{\vec{v}} \cdot \hat{\nabla}\bar{c} = \hat{\nabla}^2 \bar{c} \qquad \text{Eq. [7]}$$

where $\bar{p}$ is the dynamic pressure field (determined from the continuity equation, $\vec{\nabla} \cdot \hat{\vec{v}} = 0$). Dimensionless scalars are denoted, $(\bar{*})$, and dimensionless vectors using $(\hat{*})$. The behavior of the system is controlled by two dimensionless parameters, the Reynolds number, $Re_f = \rho U d_f / \mu$, and the Peclet number, $Pe_f = U d_f / D_0$. Here $\rho = 997.6$ kg/m$^3$ is the electrolyte density, $\mu = 0.889$ mPa-s is the electrolyte viscosity, and $D_0 = 7.2 \times 10^{-10}$ m$^2$/s is the molecular diffusivity of the species. The simulations are run at fixed $Sc \equiv \mu/\rho D_0 = 1237$. Boundary conditions were chosen to match experimental testing conditions.

FIG. 9 shows an example of preparation of flow through 3D printed graphene electrodes. The electrodes for flow tests involve preparation of a carbon ink, 3D printing of the ink and finally carbonizing them to obtain 3D printed electrodes. The carbon ink used in this study is a graphene oxide-based ink, which after processing yields 3D graphene aerogel (GA) electrodes. Single layer graphene oxide sheets (GO) having a lateral dimension of 300-800 nm purchased from Cheaptubes Inc. were used to prepare the aerogel inks. The GO suspension was prepared by ultra-sonicating 0.8 g of GO in 20 g of water for 24 h in a sonication bath which is maintained at a constant temperature of 12° C. to avoid heating during the process. This combination yields a GO concentration of 40 mg/ml. The suspension is then mixed with 5 wt % of hydroxypropyl methylcellulose GO-ink in a planetary Thinky mixer at 2000 rpm for 5 minutes. To add stiffness and stability to the ink, chopped carbon fibers with water compatible sizing is added to ink at 25 mg/ml concentration. Addition of stiff particles, carbon fibers in this case, restricts volume shrinkage of graphene oxide aerogels during the high-temperature carbonization process.

The ink was loaded into a 10 ml syringe barrel (EFD) and centrifuged for a minute at 4500 rpm to remove air bubbles, after which the ink was extruded through a micro nozzle (400 µm diameter) to pattern 3D structures on a glass substrate. For direct ink writing (DIW), the syringe was attached by a luer-lock to a smooth-flow tapered nozzle whose inner diameter (d) is 400 µm. The ink was then extruded by means of an air powered fluid dispenser (Ultimus V, EFD) which provides an appropriate pressure (in the range of 15-20 psi) for writing and the writing speed was kept at 5 mm/sec for all the 3D printed structures. Although it is not mandatory to change the PTFE nozzle tip between the prints, for the fabrication of electrodes, a new tip was used for every sample. SC lattices with multiple orthogonal layers of parallel cylindrical rods were printed alternately. The diameter of the cylindrical rods equals the diameter of nozzle and the center-to-center rod spacing of 800 µm (for 400 µm nozzle). The height of the electrodes was kept constant at 2.16 mm so that each print had a total of 9 layers and the layers were stacked on the structure such that each layer has a z spacing 240 µm. For FCC lattices, an off set of 400 µm was given in both x- and y directions, and the center-to-center rod spacing was set at 800 µm (for 400 µm nozzle) so that every odd layer will cover the gap in the even layers. Like SC lattices, the total number of layers is fixed to 9.

To avoid cracking or drying due to evaporation of water, soon after printing, the 3D printed structures are immersed in liquid nitrogen and freeze dried for 48 h in vacuum to form aerogels. The average density of as-dried electrodes was 51±4 mg/cm$^3$ for SC and 49±5 mg/cm$^3$ for FCC respectively. The printed aerogels are then subjected to a heat treatment process where the samples were heated in a tube furnace under nitrogen atmosphere at 1050° C. for 3 h with a heating and cooling rate of 2° C./min to form graphene aerogels (GA). After carbonization, the average densities of electrodes were 32±4 mg/cm$^3$ for SC and 30±2 mg/cm$^3$ for FCC.

Numerical Simulation

High resolution, continuum, computational fluid dynamics is used to simulate the flow and mass transport in the lattice geometries and enable direct comparison to the experimentally studied systems. At the limiting current, the surface concentration of the lone reactive species (i.e., $[Fe(CN)_6]^{4-}$ for oxidation of ferrocyanide) is zero and the electrochemical and electrostatic problems are decoupled. The complete, steady mass transport behavior can be described by two, one-way coupled partial differential equations for the fluid flow field, $\vec{v}$, and species concentration, c. To enable comparison across species and geometries, lengths are made dimensionless with the fiber diameter ($d_f$), timescales with the ratio of the fiber diameter to the inlet flow velocity ($d_f/U$), and concentration with the inlet concentration, $c_b$:

$$Re_f \hat{\vec{v}} \cdot \hat{\nabla} \hat{\vec{v}} = -\hat{\nabla}\hat{p} + \hat{\nabla}^2 \hat{\vec{v}} \quad \text{Eq. [8]}$$

$$Pe_f \hat{\vec{v}} \cdot \hat{\nabla}\hat{c} = \hat{\nabla}^2 \hat{c} \quad \text{EQ. [9]}$$

where $\bar{p}$ is the dynamic pressure field (determined from the continuity equation, $\vec{\nabla} \cdot \hat{\vec{v}} = 0$). Dimensionless scalars are denoted, ($\hat{*}$), and dimensionless vectors using ($\hat{\vec{*}}$). The behavior of the system is controlled by two dimensionless parameters, the Reynolds number, $Re_f = \rho U d_f / \mu$, and the Péclet number, $Pe_f = U d_f / D_0$. Here $\rho = 997.6$ kg/m$^3$ is the electrolyte density, $\mu = 0.889$ mPa-s is the electrolyte viscosity, and $D_0 = 7.2 \times 10^{-10}$ m$^2$/s is the molecular diffusivity of the species. The simulations are run at fixed $Sc \equiv \mu/\rho D_0 = 1237$.

An inlet concentration, $c_b$, and an inlet flow velocity are set on the boundary upstream of the electrode, U, equal to the superficial velocity. Because the intrinsic area per volume of the fiber is extremely high and the permeability is very low, no flow penetrates into the fiber and the reaction is concentrated near the fiber surface. Thus, in the simulation the fibers are treated as solids. On the fiber surface the concentration is fixed to zero (i.e., limiting current conditions), and the fluid obeys the no-slip boundary condition. At outlet and symmetry boundaries homogeneous Neumann (no flux) boundary conditions are applied. Simulations are performed in the computational domains pictured at the same flow rates as the experiment.

The commercial software tool Starccm+ (Siemens) can be used to solve Eqs. [8]-[9] subject to the continuity equation. The simulated (SC) and (FCC) domains are pictured and correspond to the ideally printed structures used in the experiments. Note that for the FCC simulations, only a quarter section is simulated due to symmetry. Layers are spaced 0.4325 $d_f$, and within the layer the pitch from fiber center to fiber center in both in-plane directions (perpendicular to the flow direction) is set to 1.925 $d_f$. The symmetric domain and assumed steady flow allow us to use an extracted periodic unit cell. As shown in the figure, an electrolyte region is extracted that is 10 layers thick then extend the inlet by 1.73 $d_f$. Symmetry boundary conditions are applied on the sides of the extended domain and on all symmetry boundaries within the unitcell. Extending the inlet and applying symmetry boundary conditions allows us to identify U as equivalent to the superficial velocity. The built-in meshing tools can be used to generate a predominantly hexahedral (Trimmer) computational mesh with finite-volume, cell size of $d_f/160$. To resolve the transport behavior in the boundary layers, the mesh is augmented with surface parallel, prism layers of thickness ($d_f/50$) adjacent to the fiber surfaces and composed of 16 cells with a stretching ratio of 1.1. The smallest cell is adjacent to the fiber and has thickness$\approx d_f/1855$.

For the simulations the inlet velocity boundary condition can be changed to correspond to the experimentally measured velocities. Thus, though a range of $Pe_f$ and $Re_f$ is explored these are not independently varied. Further, time-dependent simulation was performed on a full periodic domain at the highest $Re_f$ reported in the manuscript and found that the flow remained steady with the exception of the FCC simulation at $Re_f = 60.76$. Computations were performed on Livermore Compute Cluster Resources with each simulation run requiring 1-2K core-hour to converge to a solution.

Figure 10:
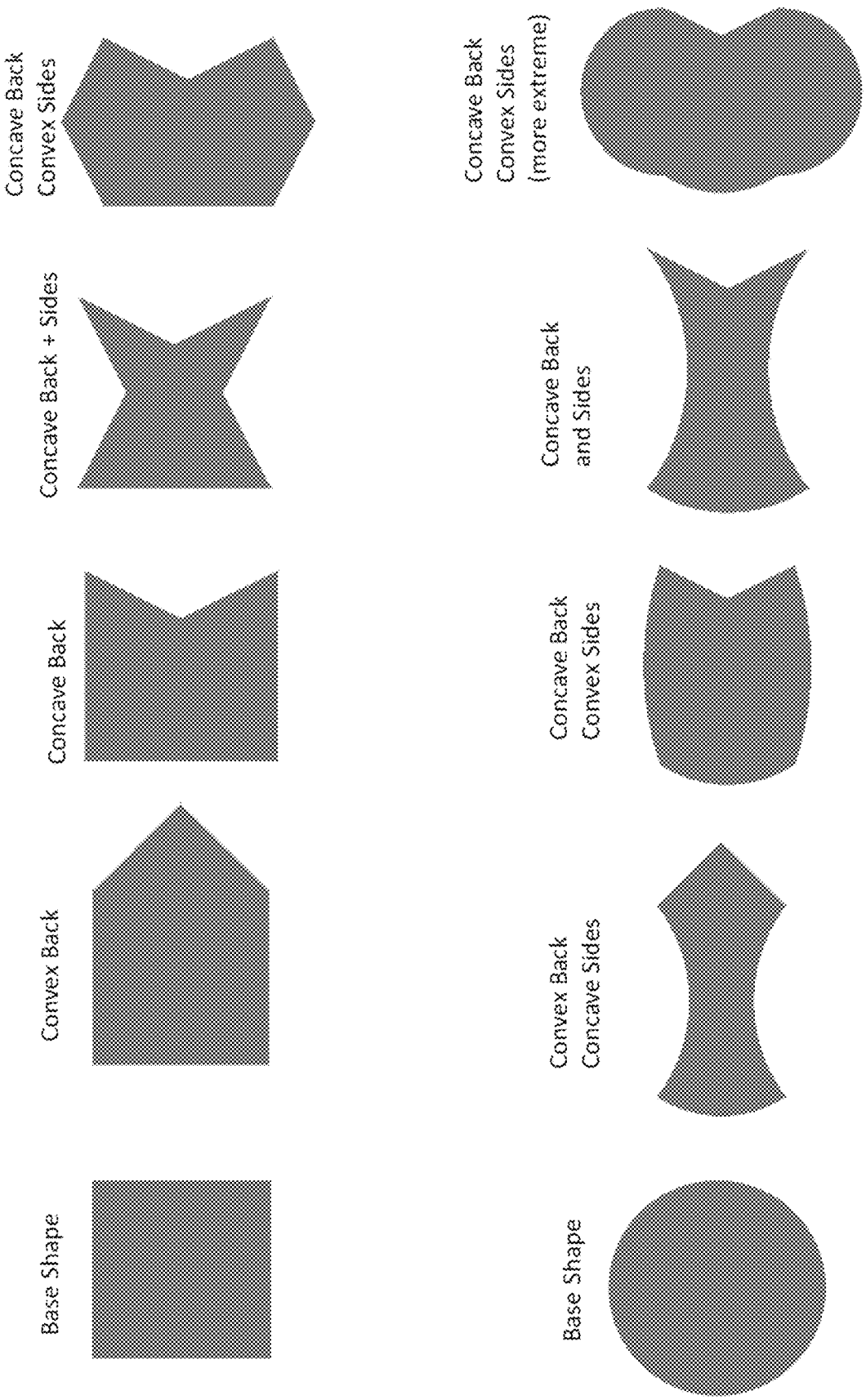
FIG. 10 depicts examples of fiber cross-sectional shapes.

FIG. 10 depicts examples of fiber cross-section shapes, in accordance with some example embodiments. For example, FIG. 1 at 110 shows fibers with a circular cross-sectional shape. In the example at 110, fluid flows from left to right in the diagram. Instead of the circular cross-sectional shape at 110 in FIG. 1, one or more, or all of the fibers can have a different cross-sectional shape such as the example shapes shown in FIG. 10. In the example cross-sectional shapes shown in FIG. 10, fluid can flow from left to right as in FIG. 1 at 110. In FIG. 10, two rows of example shapes are shown, each row starting with a base shape. The top row starts with a base shape that is square and the bottom row starts with a circular base shape. Example variations of each base shape are shown in the other elements of each row. For example, from the square base shape, example variations include convex back, concave back, concave back and sides, and concave back with convex sides. Other variations of the square base shape are also possible. From the circular base shape of the second row, variations include convex back with concave sides, concave back with convex sides, concave back and sides, and a more extreme concave back with concave sides. Other variations of the circular base shape are also possible. Other base shapes with corresponding variations are also possible such as a triangular base shape or other base shape. These various cross-sectional shapes produce different corresponding inertial flows.

Figure 11:
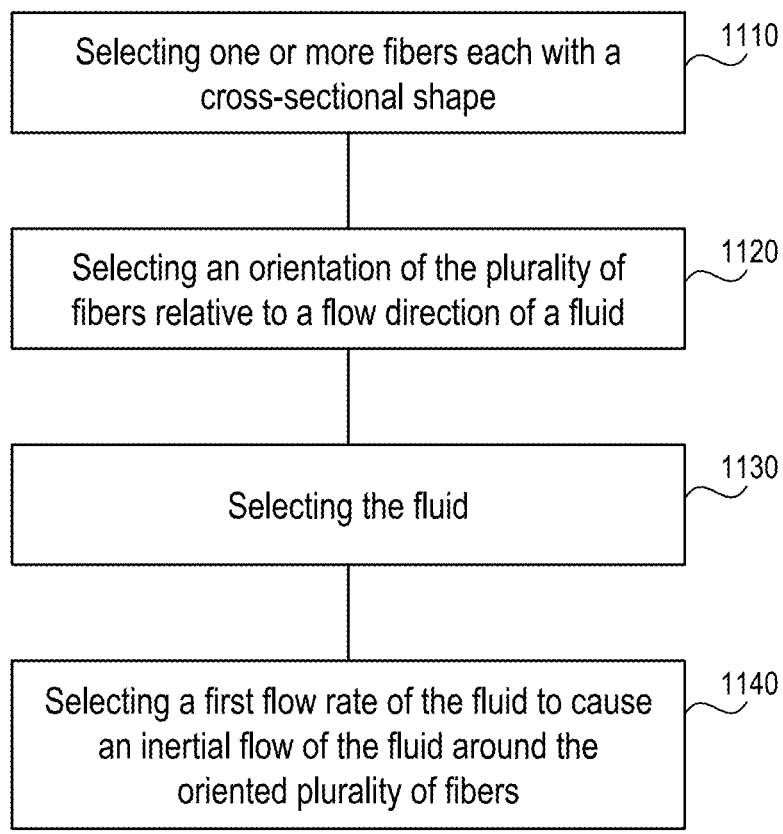
FIG. 11 depicts an example of a process.

FIG. 11 depicts an example of a process for designing a flow through electrode. At 1110, the process includes selecting one or more fibers each with a cross-sectional shape. At 1120, the process includes selecting an orientation of the plurality of fibers relative to a flow direction of a fluid. At 1130, the process includes selecting the fluid. At 1140, the process includes selecting a first flow rate of the fluid to cause an inertial flow of the fluid around the oriented plurality of fibers.

In some example embodiments, the subject matter described herein may be embodied in systems, apparatus, methods, and/or articles depending on the desired configuration. For example, some example embodiments can be implemented using one or more of the following: electronic components, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein.

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A flow through electrode apparatus comprising:
a plurality of fiber layers that are stacked such that fibers in the plurality of fiber layers together form a periodic lattice structure characterized by a mesoscopic length scale,
wherein the periodic lattice structure is configured to orient the fibers orthogonal to a flow direction of a fluid in order to enhance a formation of wake flows of the fluid behind each fiber at an inertial flow rate of the fluid, the wake flows being configured to induce an inertia-dominant mass transfer for the flow through electrode apparatus, and
wherein the fibers forming the periodic lattice structure are configured to generate an inertial flow of the fluid at flow rates greater than or equal to the inertial flow rate and a creeping flow at flow rates less than the inertial flow rate.

2. The apparatus of claim 1, wherein the inertia-dominant mass transfer is greater compared to a mass transfer that is induced at a lower flow rate of the fluid.

3. The apparatus of claim 1, wherein each of the fibers has a predetermined cross-sectional shape.

4. The apparatus of claim 3, wherein the cross-sectional shape is circular, circular convex back with concave sides, circular concave back with convex sides, or circular concave back and sides.

5. The apparatus of claim 3, wherein the cross-sectional shape is square, square convex back, square concave back, square concave back and sides, or square concave back with convex sides.

6. The apparatus of claim 3, wherein the cross-sectional shape has a plurality of sharp edges.

7. The apparatus of claim 1, wherein the fibers are oriented to produce a face centered cubic (FCC) structure.

8. The apparatus of claim 1, wherein the inertial flow rate causes a flow that is characterized by a Reynolds number greater than 1.

9. The apparatus of claim 1, wherein the wake flows comprise one or more of:
an eddy flow;
a recirculating flow;
a secondary flow; or
a recirculation bubble.

10. The apparatus of claim 1, wherein each of the plurality of fiber layers are configured to produce an unperturbed flow farther in the flow direction.

11. The apparatus of claim 1, wherein the plurality of fiber layers is fabricated using one or more of:
a 3D printing process;
a casting process;
a molding process; or
a photolithography process.

* * * * *